US011475080B2

(12) United States Patent
Srinivasaraghavan et al.

(10) Patent No.: US 11,475,080 B2
(45) Date of Patent: Oct. 18, 2022

(54) NATURAL LANGUAGE-BASED SEARCH AND DISCOVERY OF CONTENT SERVICE

(71) Applicant: Verizon Patent and Licensing Inc., Arlington, VA (US)

(72) Inventors: Haripriya Srinivasaraghavan, Plano, TX (US); Praveen Kumar Bandaru, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 457 days.

(21) Appl. No.: 16/561,554

(22) Filed: Sep. 5, 2019

(65) Prior Publication Data
US 2021/0073302 A1   Mar. 11, 2021

(51) Int. Cl.
*G06F 40/295* (2020.01)
*G06F 16/9532* (2019.01)
*G06F 16/9535* (2019.01)
*G06F 16/9538* (2019.01)
*G06F 40/30* (2020.01)
*G06F 40/205* (2020.01)
G06F 3/0484 (2022.01)

(52) U.S. Cl.
CPC ...... *G06F 16/9532* (2019.01); *G06F 16/9535* (2019.01); *G06F 16/9538* (2019.01); *G06F 40/205* (2020.01); *G06F 40/295* (2020.01); *G06F 40/30* (2020.01); *G06F 3/0484* (2013.01)

(58) Field of Classification Search
CPC ......... G06F 16/90; G06F 40/20; G06F 40/30; G06F 16/9532; G06F 16/9535; G06F 16/9538; G06F 40/205; G06F 40/295; G06F 3/0484; G06F 16/3334; G10L 15/00; G10L 15/1822
See application file for complete search history.

(56) References Cited

U.S. PATENT DOCUMENTS

2016/0357851 A1* 12/2016 Perkins ............... G06F 40/30
2017/0242857 A1*  8/2017 Kim .................. G06F 16/2365
2017/0278514 A1*  9/2017 Mathias ................ G10L 15/22

* cited by examiner

*Primary Examiner* — Sanchita Roy

(57) ABSTRACT

A method, a device, and a non-transitory storage medium are described, which provide a natural language-based content search and discovery service. The natural language-based content search and discovery service may use query object types as a basis for interpreting a vocalized search query from a user. The natural language-based content search and discovery service may use a multi-interpretative procedure that includes use of a probabilistic grammar parser, parts of speech, and query object type identification that are configured for a media domain. The natural language-based content search and discovery service may merge different interpretations of the search query based on probability values associated with each interpretation.

20 Claims, 5 Drawing Sheets

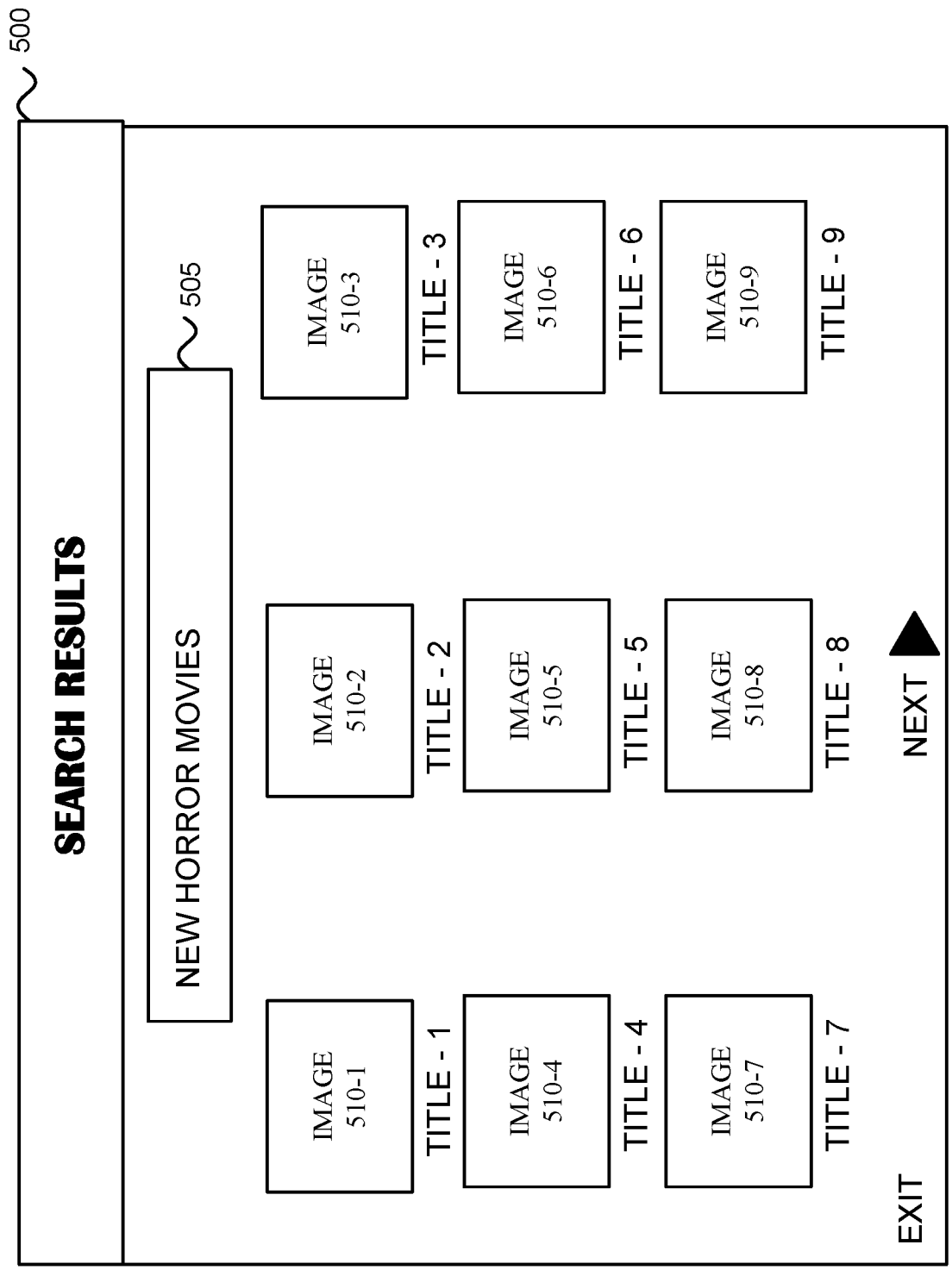

NATURAL LANGUAGE-BASED SEARCH AND DISCOVERY OF CONTENT SERVICE

BACKGROUND

Content networks use various network devices to manage content (e.g., movies, television programs, on-demand programming, etc.) and corresponding aggregated metadata (e.g., catalogs, indexes, titles, metadata of content, etc.) which are searchable by users. A content service, responsive to queries received from the user, may use search, selection, and recommendation systems that filter, identify, and present content titles that are potentially of interest to users. User satisfaction with the search experience depends on the relevance of the results returned, as well as the time and effort involved in formulating a query.

BRIEF DESCRIPTION OF THE DRAWINGS

FIG. 5 is a diagram illustrating an exemplary user interface.

DETAILED DESCRIPTION OF PREFERRED EMBODIMENTS

Figure 1:
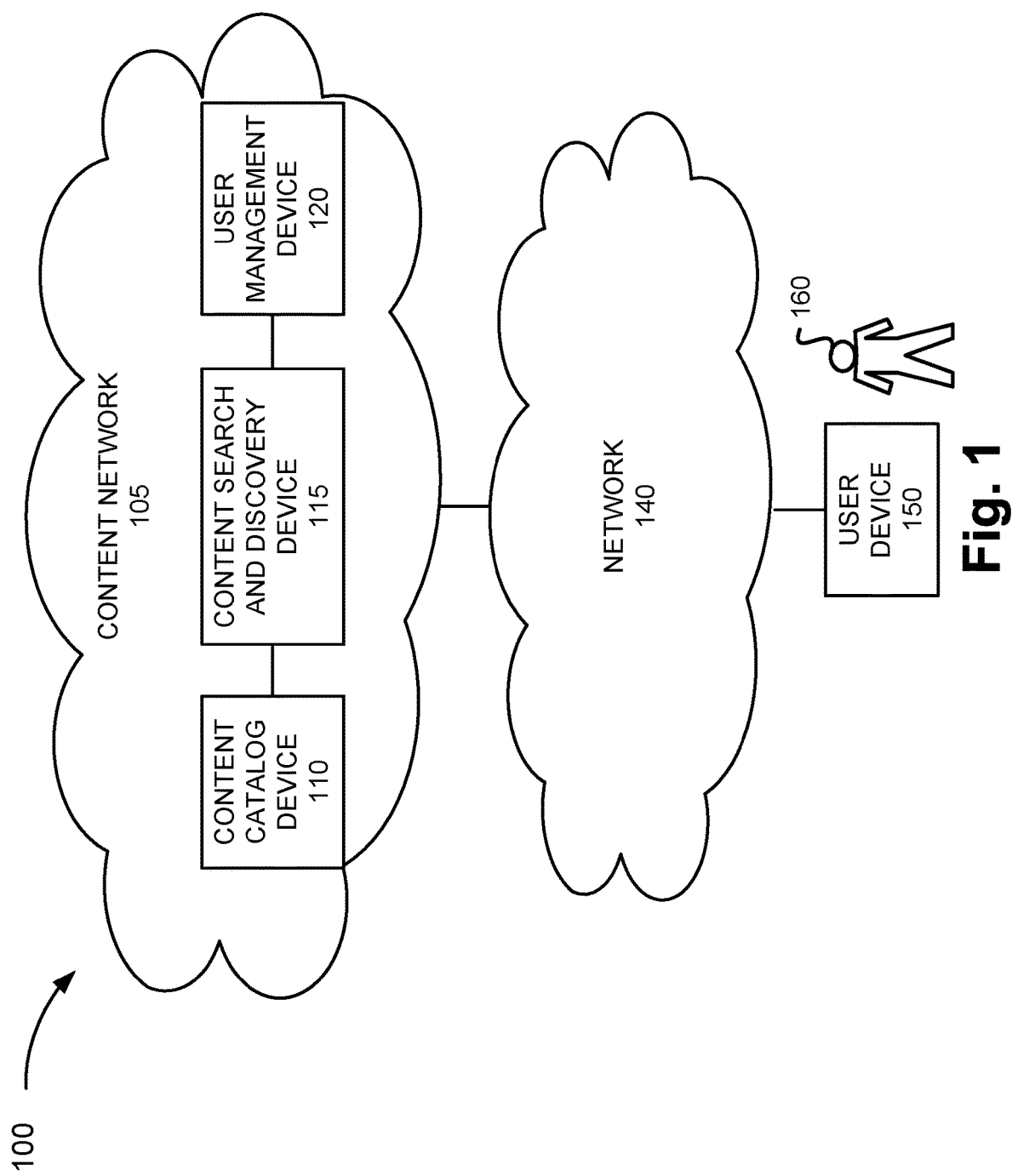
FIG. 1 is a diagram illustrating an exemplary environment in which exemplary embodiments of a natural language-based search and discovery service may be implemented.

The following detailed description refers to the accompanying drawings. The same reference numbers in different drawings may identify the same or similar elements. Also, the following detailed description does not limit the invention.

Users are subjected to the time-consuming task of sifting through an ever-expanding collection of contents (e.g., video, audio, audio and video, text, web pages, movies, television programs, books, etc.) that is available for consumption from content providers. Intelligent content search and discovery technology—designed to search and return available content responsive to user queries—has not kept pace with advances in content generation/delivery capabilities. For example, with voice input-based systems, users are willing to provide more details pertaining to their search because it is easy to speak their search criteria. However, users that are searching for specific content may receive generic results despite having given plentiful information to use for searching a desired content. Additionally, search results may not be personalized for users. For example, depending on the user, a search for an "action" movie may mean a search for a "war" movie or a "fugitive" movie.

Consequently, existing content search and discovery systems may unnecessarily expend network resources by generating less-than-optimal search results for users. Further, network resources may be also unproductively used to present undesirable content to the users, which may result in extended browsing sessions and lower user content-selection rates. Accordingly, the individual user experience would be improved, and the consumption of content generally increased, by more efficiently-performing search and discovery of content based on natural language voice input.

According to exemplary embodiments, a natural language-based content search and discovery service is described. For example, the service may be provided by a content delivery system that includes logic to associate search strings to cataloged content items from a content collection, based on both personalized and non-personalized factors for correlating content to search terms. As described herein, search strings may include a single character (e.g., a letter, a numeral, a special character, etc.), a single term of multiple characters (e.g., a word, etc.), and/or multiple terms (e.g., a phrase, etc.).

According to an exemplary embodiment, the natural language-based content search and discovery service uses a multi-interpretative framework, as described herein, for generating a unified natural language understanding (NLU) query. According to an exemplary embodiment, the natural language-based content search and discovery service uses query object types as a basis for interpreting a vocalized search query from a user. According to an exemplary embodiment, the query object types include an intent type and an entity type, as described herein. According to an exemplary embodiment, the multi-interpretative framework includes multiple parsings of the search query based on a probabilistic grammar parser, parts of speech, and query object type identification that are configured for the media domain. The multi-interpretative framework may further include stemming and/or lemmatizing. According to an exemplary embodiment, the natural language-based content search and discovery service may merge different interpretations of the search query based on probability values associated with each interpretation. According to an exemplary embodiment, the natural language-based content search and discovery service may merge results returned by the top interpretations of the natural language query with the top results selected previously for that query thus providing a better set of search results.

In view of the foregoing, the natural language-based content search and discovery service, as described herein, improves the content offering experience by condensing a content collection according to prescribed functions to feature content of prime interest to a user. For example, the natural language-based content search and discovery service searches, identifies, and presents content items that represent the top content items responsive to natural language voice input from a user. Consequently, network resources that are used to generate the content offerings may be reduced relative to existing content search and discovery systems. For example, the natural language-based content search and discovery service may reduce overall content search times, reduce utilization of processing resources (e.g., processor, memory, etc.), and present select content items to a user for consideration and selection more efficiently and/or accurately over time than existing search and discovery systems, thereby improving the user experience and minimizing network resource usage.

FIG. 1 is a diagram illustrating an exemplary environment 100 in which an exemplary embodiment of the natural language-based content search and discovery service may be implemented. As illustrated, environment 100 includes a content network 105 and a network 140. Content network 105 may include a content catalog device 110, a content search and discovery device 115, and a user management device 120. According to other embodiments, environment 100 may include additional networks, fewer networks, and/ or different types of networks than those illustrated and described herein. Environment 100 also includes an end device 150 that may be operated by a user 160.

The number and arrangement of network devices in content network 105, and the number of user devices 150 are exemplary. According to other embodiments, environment 100 may include additional devices, fewer devices, and/or differently arranged devices, than those illustrated in FIG. 1. For example, a single device in FIG. 1 may be implemented as multiple devices and/or multiple devices may be implemented as a single device. A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, a cloud device, a virtualized function, etc). The number and the type of network devices illustrated and described in environment 100 are exemplary.

Environment 100 includes communication links between the networks and communication links between the network devices. Environment 100 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

Content network 105 includes a network that provides access to and use of a content service. Generally, content network 105 may be implemented as a satellite-based network, a terrestrial-based network, or a combination thereof. For example, content network 105 may be implemented to distribute content using various technologies, such as an optical architecture, a coaxial cable architecture, an Internet Protocol (IP) TV architecture, a digital subscriber line (DSL) architecture, a wireless architecture, a streaming architecture, a cloud architecture, a virtual network architecture, a multi-edge computing (MEC) network, and/or an Internet-based architecture. Depending on the architecture implemented, content network 105 may include various types of network devices that contribute to the access and use of the content service by users. For example, the content service may allow users to view various contents. The content service may support various methods of consumption of content, such as streaming, downloading, etc.

According to an exemplary embodiment, content network 105 includes network devices that provide the natural language-based content search and discovery service, as described herein. According to an exemplary embodiment, the natural language-based content search and discovery service is provided based on content catalog device 110, content search and discovery device 115, and user management device 120.

Content catalog device 110 includes a network device that stores and manages cataloged metadata of content. According to an exemplary embodiment, the content may be audio and visual content, such as, for example, movies, television programs, network broadcasts, video-on-demand (VOD) content, premium channel content, and/or other types of audio and visual content. According to other exemplary embodiments, content may include audio content, such as, for example, music, books, podcasts, etc., and/or other forms of content (e.g., text, multimedia, etc.). Content catalog device 110 may include a mass storage device. Content catalog device 110 may include logic that provides various storage-related functions, such as, add, delete, update, etc., relating to the metadata. Content catalog device 110 may include logic that performs a query process. For example, content catalog device 110 may receive a query request from content search and discovery device 115, generate a query response, and transmit the response to content search and discovery device 115. According to other exemplary embodiments, content catalog device 110 may not include logic that performs the query process.

The metadata may include, for example, data indicating a title of a content, a genre and/or a sub-genre of the content, cast and crew information, storyline information (e.g., plot summary, synopsis, tagline, etc.), a movie rating or a television rating (e.g., R, PG-13, TV 14, etc.), a date of release, a language, a runtime, a video format (e.g., 4K, HD, 3D, etc.), an audio format (e.g., stereo, Dolby Surround 7.1, etc.), filming location information, recording location information, company credit information (e.g., production company, distributor, etc.), rating (e.g., user, critic, etc.), review (e.g., user, critic, etc.) and/or other information that pertains to the content (e.g., an image, a video trailer, a web site address, an audio book sample, biographies, links to other related content, deleted/behind the scenes content, etc.). In one embodiment, the metadata may include associated cost information (e.g., price, free, rent, buy, etc.) for the content. According to other exemplary embodiments, content catalog device 110 may store the metadata in various types of data structures (e.g., a tree structure, a graph, a neural network, etc.) and/or other type of information storage entity (e.g., a database).

Figure 2:
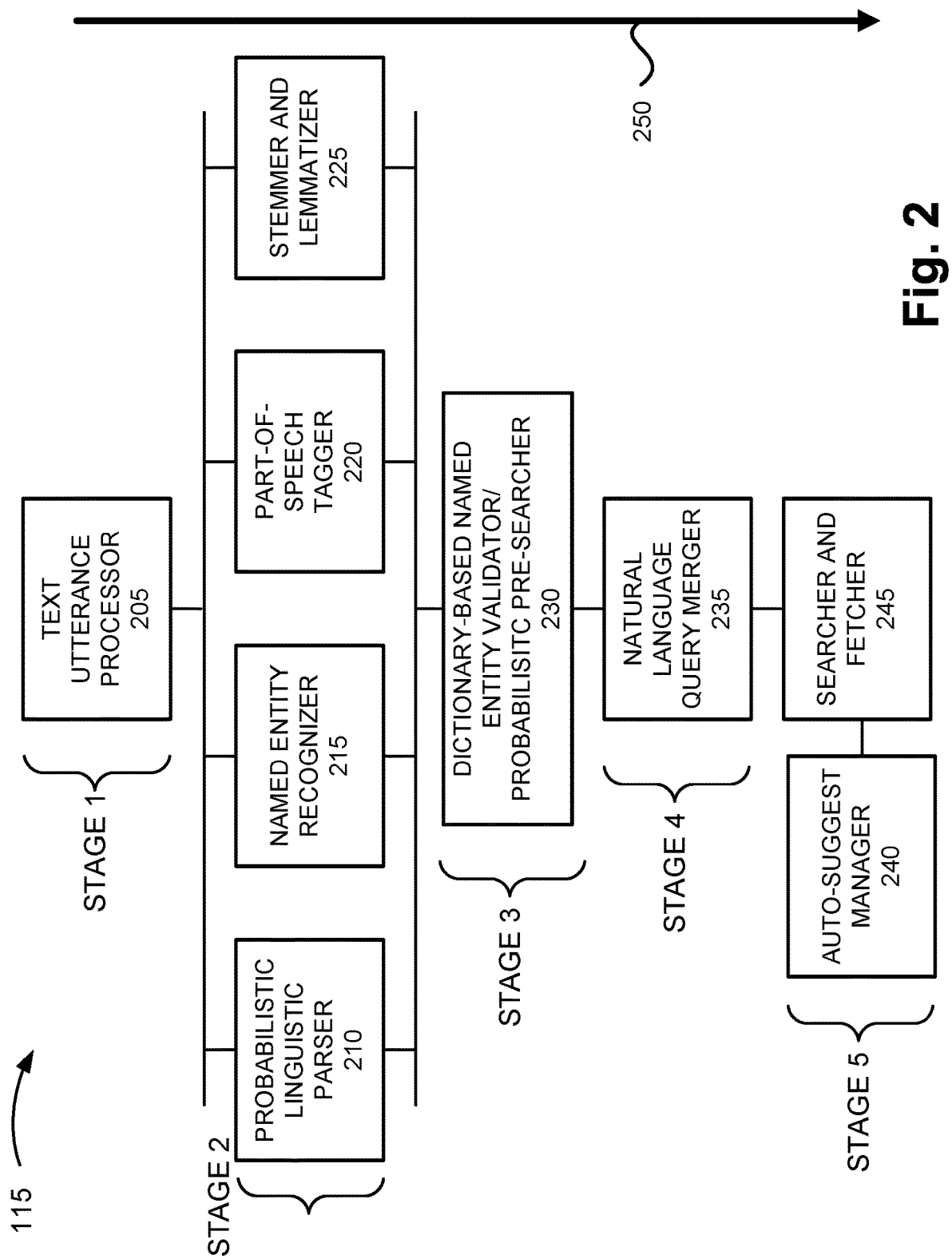
FIG. 2 is a block diagram illustrating exemplary components of a content search and discovery device of FIG. 1.
Figure 3:
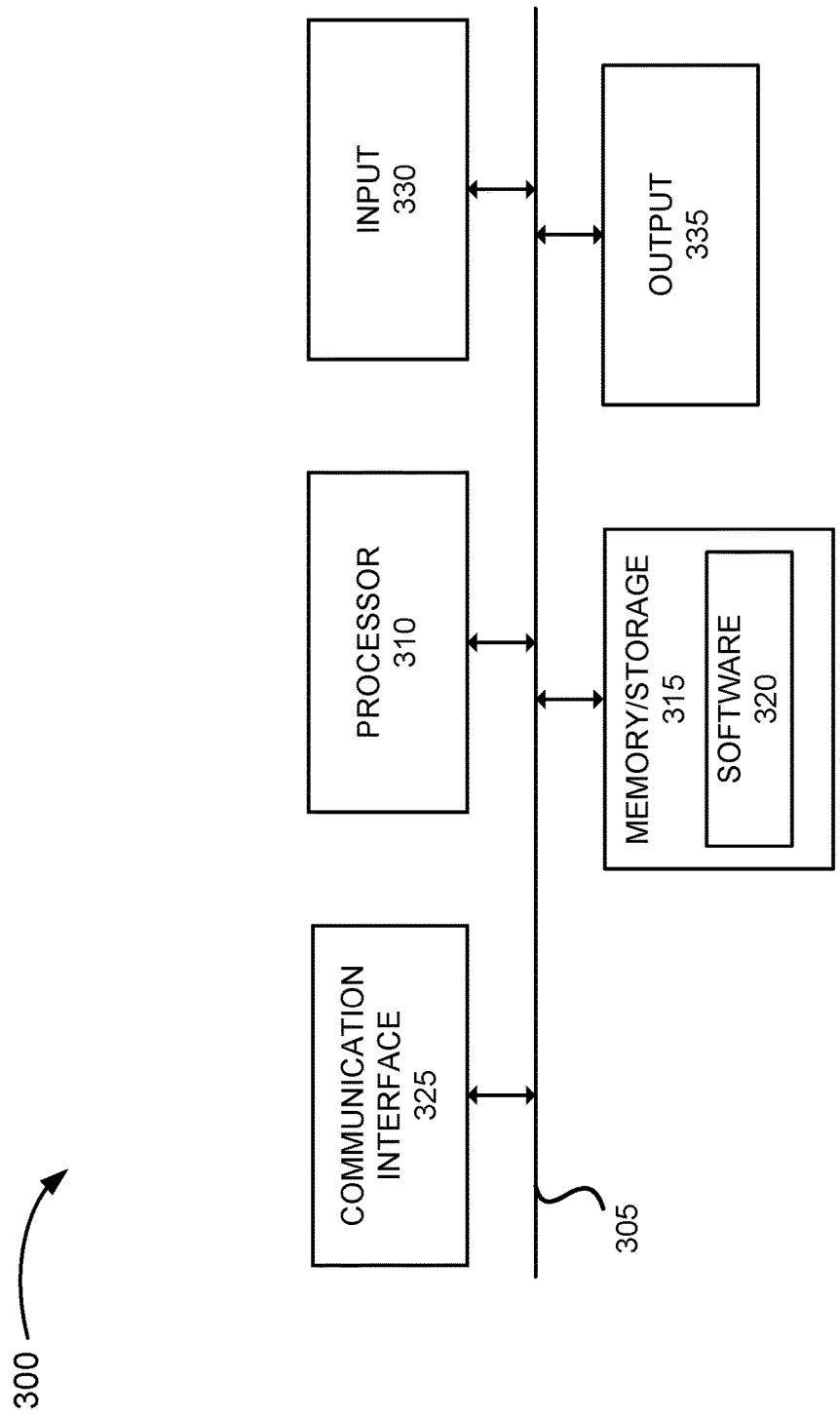
FIG. 3 is a diagram illustrating exemplary components of a device that may correspond to one or more of the devices illustrated and described herein.

FIG. 2 is a block diagram illustrating exemplary components of content search and discovery device 115. The functions described in connection with FIG. 2 may be performed by one or more components of device 300 (FIG. 3). As illustrated in FIG. 2, content search and discovery device 115 may include a text utterance processor 205, a probabilistic linguistic parser 210, a named entity recognizer 215, a part-of-speech (POS) tagger 220, a stemmer and lemmatizer 225, a dictionary-based named entity validator/probabilistic pre-searcher 230, a natural language query merger 235, an auto-suggest manager 240, and a searcher and fetcher 245 that provides an exemplary embodiment of the natural language-based search and discovery service. Other configurations may be implemented. Therefore, content search and discovery device 115 may include additional and/or different components than those depicted in FIG. 2 and described herein. The connections among the components illustrated and described are also exemplary. For reference sake, FIG. 2 illustrates stages 1-5 in relation to certain components depicted and the natural language-based search and discovery service. The stages illustrated may represent a sequence of processes that may be performed to provide the natural language-based search and discovery service. For example, the initial stage (Stage 1) may receive an input and may provide an output to Stage 2, and so forth, as illustrated by arrow 250.

According to an exemplary embodiment, content search and discovery device 115 includes logic that provides a user interface (e.g., an interactive graphical user interface (GUI)) for users. For example, the user interface may display (e.g., text) stemming from a voice input of a user and the results of a search for content. According to other exemplary embodiments, content search and discovery device 115 may not provide the user interface, and another network device of the content service (not illustrated) may provide the user interface.

According an exemplary embodiment, content search and discovery device 115 may provide the natural language-based search and discovery service based on intent types and entity types. Examples of intent types may include a word or a phrase, such as search, play, like this, navigate, control, find, or other types of words or phrases that relate to the user's intent (e.g., a user command, etc.). Examples of entity types may include a word or a phrase, such as a person (e.g., an actor's name, cast, crew, or other person's name or portion thereof), a title of a content (e.g., a title of a movie, a show, a game, or other type of content), a type of content (e.g., a movie, a game, a show, music, or other content type), a topic (e.g., a theme, a character name, a time period, a setting, or other characteristic pertaining to the content), a team (e.g., a sports team name, etc.), a league (e.g., NBA, MLB, or other sports league), a channel (e.g., a channel name, a channel number, a channel affiliate name, or another channel identifier), an application (e.g., a content provider, an application name, a widget, etc.), Boolean operators (e.g., and, or, not), a modifier (e.g., latest, popular, award-winning, top-rated, trending, or other types of descriptors of a content), and genre (e.g., drama, action, comedy, or another type of genre or sub-genre). These examples are not intended as an exhaustive list of such types but merely illustrative. Accordingly, other words or phrases not specifically mentioned herein may be representative of an intent type or an entity type.

Content search and discovery device 115 may include logic that provides the natural language-based search and discovery service based on information from content catalog device 110, user management device 120, user device 150, and user 160 (e.g., voice input, user input to a user interface provided for searching and retrieving content, etc.), as described herein.

Text utterance processor 205 may include logic that converts a voice input into text. For example, text utterance processor 205 may include a speech-to-text converter. Additionally, or alternatively, text utterance processor 205 may include logic that receives text (e.g., from an automatic speech recognition (ASR) engine) or other user input component. For example, a user may vocalize a search for content, and the corresponding text may be input to text utterance processor 205. Text utterance processor 205 may tokenize the input text for natural language processing. For example, text utterance processor 205 may separate words, numbers, or other portions of the text, and may generate the text into a canonical form. Text utterance processor 205 may also remove punctuation from the text. Text utterance processor 205 may output the tokenized text to probabilistic linguistic parser 210, named entity recognizer 215, part-of-speech tagger 220, and stemmer and lemmatizer 225.

Probabilistic linguistic parser 210 may include probabilistic grammar parser logic. For example, probabilistic linguistic parser 210 may include a probability context-free grammar (PCFG) parser that parses the output from text utterance processor 205. According to another example, probabilistic linguistic parser 210 may use another type of parser (e.g., a weighted CFG (WCFG)). Probabilistic linguistic parser 210 may use lookup tables or other type of information entity that correlates probabilities to the parsing of the received input. Probabilistic linguistic parser 210 may identify the entities, categories, and modifiers based on the output from the PCFG parser, and generate a unified natural language understanding (NLU) query. For example, for a text input of "find Tom Hanks courtroom drama or thrillers not R rated," the PCFG parser may parse the text input as:

(S (SAP find))
(PE Tom Hanks)
(TO courtroom)
(OR or (GG dramas)(GG thrillers))
(NOT not (RT r)))

A legend for SAP, PE, etc., is provided below.

Additionally, for example, the NLU query may be represented as:

("intent":"search",
    "query": ("bool": "and", "filters" : (
        ("person": ("values": ("Tom Hanks"))),
        ("genre": ("bool": "or", "values": ("action", "adventure"))),
        ("topic": ("values":("courtroom"))),
        ("rating":("bool": "not", "values":("R")))
    ))
    )

According to another example, for a text input of "show movies like Frozen", the NLU query may be represented as:

("intent": "more like this",
    "query":("bool": "and", "filters": (
        ("title": ("values" : ("Frozen")))
    )

Probabilistic linguistic parser 210 includes grammar rules for text relating to content search queries using a linguistic method. In contrast to using a deep learning method based on a set of samples, probabilistic linguistic parser 210 uses the grammar to generate the samples, but also uses the grammar as a validation for text in a given search query structure. Probabilistic linguistic parser 210 may also resolve disambiguation among different interpretations of the text based on an assigned probability of an interpretation associated with a query object relative to another assigned probability of another interpretation associated with the query object. Additionally, or alternatively, probabilistic linguistic parser 210 may identify multiple interpretations or iterations of production for a query object and probability values. Probabilistic linguistic parser 210 may update probabilities and/or interpretations associated with grammar productions based on feedback information from other components of content search and discovery device 115. For example, probabilistic linguistic parser 210 may obtain feedback information (e.g., query object interpretations, probability values, part-of-speech assignments, etc.) from natural language query merger 235 that may be used as a basis for machine learning by probabilistic linguistic parser 210. Probabilistic linguistic parser 210 may also compute combined probabilities for a phrase or an n-gram using conditional probabilities of individual entities. This may be useful in ranking commonly used combinations of entities higher in relevance compared to an unlikely combination of entities even though the individual entities may have high probabilities. For example, "NFL games" may rank higher in relevance and probability than "NFL movies" even though "movies" may rank higher than "games."

An exemplary embodiment of the grammar rules are set forth below in a Backus Normal Form (BNF) with the probabilities not illustrated:

```
TitleSearchPCFGStr = """"
S -> TAP TMOD TTI TMT
S -> TAP TMOD TPE2 TTO2 TMT
S -> TAP TMOD TMT TTO2X
S -> TAP TMOD TMT TPE2X
S -> TAP TMOD TTM2 TSMT
S -> TAP TMOD TTL TSMT
TMOD -> "<START:mod>" MOD "<END>"
TMOD ->
TTI -> "<START:title>" TI "<END>"
TPE2 -> TPE | TPE "and" TPE | TPE TPE |
TPE2X -> TPEQ TPE | TPEQ TPE "and" TPE | TPEQ TPE TPE |
TTO2 -> TTO | TTO "and" TTO | TTO TTO |
TTO2X -> TTOQ TTO | TTOQ TTO "and" TTO | TTOQ TTO TTO |
TTM2 -> TTM | TTM "versus" TTM | TTM "against" TTM | TTM "and" TTM |
TTOQ -> "<START:not>" WITHOUT "<END>" | WITH
TPEQ -> "<START:not>" NOTBY "<END>" | BY
NOT -> "not"
NOTBY -> "not by" | "without actor" | "not with" | "not starring"
BY -> "by" | "of" | "with actor" | "starring" | "with"
WITH -> "about" | "with" | "containing"
WITHOUT -> "without" | "not with" | "not about"
TTO -> "<START:topic>" TO "<END>"
TPE -> "<START:person>" PE "<END>"
TTM -> "<START:team>" TM "<END>"
TTL -> "<START:league>" TL "<END>"
TMT -> "<START:media>" MT "<END>"
TMT ->
TSMT -> "<START:media>" SMT "<END>"
TSMT ->
TAP -> "<START:search>" AP "<END>"
TAP ->
MOD -> "top" | "best" | "popular" | "recent" | "latest" | "newest"
MT -> "movie" | "on tv" | "series" | "shows" | "movies" | "show"
SMT -> "games" | "game" | "match" | "matches" | "tournament" | "tournaments"
AP -> "show me" | "search for" | "search" | "get me" | "find me" | "go to" | "find all"
"""""
```

Terminals may be loaded into lookup tables from databases with associated probabilities.

TI->loadShowAndMovieTitles ( )
PE->loadPeople ( )
TO->loadTopics ( )
TM->loadTeamNames ( )
TL->loadLeagueNames ( )

Legend:
S: Starting point for Search Action
TAP: Tagged action phrase
TMOD: Tagged modifier
TTI: Tagged title
TMT: Tagged media type
TSMT: Tagged sports media type
TPE2: Tagged people phrase with up to 2 people
TPE2X: Tagged people phrase with inclusion modifiers
TTO2: Tagged topic phrase with up to two topics
TTO2X: Tagged topic phrase with inclusion modifiers
TTM2: Tagged team phrase with up to 2 teams
TTOQ: Tagged inclusion modifier for topics (e.g., with/without)
TPEQ: Tagged inclusion modifier for people (e.g., by/not by)
TTO: Tagged topic phrase
TPE: Tagged person phrase
TTM: Tagged team phrase
TTL: Tagged league phrase
MOD: Modifier—List of modifier terminals
ML: MediaType—List of mediatype terminals
SMT: SportSMediaType—List of sports mediatype terminals
AP: Action phrase—List of action phrase terminals
NOT: List of terminals meaning "not"
NOTBY: List of terminals meaning "not by/with a person"
BY: List of terminals meaning "by/with a person"
WITH: List of terminals meaning "with or containing"
WITHOUT: List of terminals meaning "without or not containing"
TT: Show Title (Movie or Series)
PE: Person
TO: Topic
TM: TeamName
TL: LeagueName Named entity recognizer 215 may include logic that infers named entities in the text. For example, named entity recognizer 215 may include a trained named entity model that is able to generalize novel or obscure entities. For example, for a query search of "movies acted by Jackie Chan," named entity recognizer 215 may tag "Jackie Chan" as a person even though the training samples of the named entity model may not specifically include "Jackie Chan." Named entity recognizer 215 may not flag a sentence structure.

Named entity recognizer 215 may provide an output based on the intent and entity types, as described herein. For example, for a query search, such as "what was the Tom Cruise courtroom drama?", named entity recognizer 215 may provide an output, such as: {intent: ["search"] and entities {person: ["Tom Cruise"], genre: ["drama"], topic: ["courtroom"]}.

Part-of-speech tagger 220 may include logic that generates the parts-of-speech of a query. For example, part-of-speech tagger 220 may include a model that splits a text string into different sub-sentence structures or fragments, such as a verb, a noun, an adjective, an adverb, a conjunction, a preposition, a pronoun, singular, plural, a gerund, possessive, and other types of syntactic and morphological structures (e.g., a prefix, a suffix, a Boolean operator, etc.). Part-of-speech tagger 220 may perform other operations, such as disambiguation, medial capitalization to extract names, etc. For example, a query search such as "find Tom Hanks courtroom dramas or thrillers not R rated," part-of-speech tagger 220 may provide the following exemplary output: (S (VP find (SBAR (S (NP Tom Hanks) (NP (NP courtroom dramas) or (NP (NP thrillers) not (SBAR (S (NP R)(VP rated)))))))))). For example, VP indicates a verb phrase and NP indicates a noun phrase. According to this example, "courtroom" and "dramas" are and'ed and then or'ed with "thrillers." Also, for example, S indicates a simple declarative clause, and SBAR indicates a clause introduced by a (possibly empty) subordinating conjunction.

Stemmer and lemmatizer 225 may include logic that uses stemming techniques to reduce each word of a query to its primitive form. Stemmer and lemmatizer 225 may be trained with root forms in a given catalog. For example, in standard English, the word "rate" may be the root word for the word "rating", but in a content or media domain, the word "rating" may be the root word. As an example of an output, stemmer and lemmatizer 225 may receive a query search, such as "find Tom Hanks courtroom dramas or thriller movies without R ratings," and output "find Tom Hanks courtroom drama or thriller movie without R rating." According to another example, the word "thrillers" may be stemmed to "thriller" (e.g., a genre) but should not be stemmed to the base word "thrill." Similarly, the word "historical" (e.g., a genre) should not be stemmed to "historic." Stemmer and lemmatizer 225 may manage both inflectional variance and derivational variance, may consider context, may identify the dictionary form of a word (e.g., a lemma), and may identify the stem of a word (e.g., which may or may not have a dictionary meaning), and so forth. Additionally, for example, stemmer and lemmatizer 225 may include logic to forego a word or phrase reduction for keywords that may be included in the metadata of content which are useful from an interpretative standpoint of the vocalized search query of the user. For example, a query search, such as "light-hearted movie", stemmer and lemmatizer 225 may include an output "light-hearted movie."

Dictionary-based named entity validator/probabilistic pre-searcher 230 may include logic that receives output from probabilistic linguistic parser 210, named entity recognizer 215, part-of-speech tagger 220, and stemmer and lemmatizer 225. For each value that has been tagged with a category (e.g., a person, a title, a content type, etc.), dictionary-based named entity/probabilistic pre-searcher 230 may perform a lookup into a corresponding reverse lookup table or other type of suitable data structure/entity, and return a value and a probability score. If a value (e.g., a word, etc.) is not available, dictionary-based named entity validator/probabilistic pre-searcher 230 may use a modified word from stemmer and lemmatizer 225 as a replacement word, and perform another lookup within a same category as the original word. If the value is still missing or after all modified words have been searched, dictionary-based named entity validator/probabilistic pre-searcher 230 may mark the value as unavailable and assign a probability score to 0. However, if the lookup yields a value, dictionary-based named entity validator/probabilistic pre-searcher 230 may add a normalized value with the probability score and type into the position of the value.

As an example, consider a search query string of "find Tom Hanks courtroom dramas or thriller movies without R ratings." Dictionary-based named entity validator/probabilistic pre-searcher 230 may yield the following exemplary results:

TABLE 1

| Word | Entity | Normalized Value | Probability value | Input |
|------|--------|------------------|-------------------|-------|
| Find | Action phrase | Search | 0.8 | 210, 215, 220 |
| Tom Hanks | Person | Tom Hanks | 0.9 | 210, 215, 220 |
| Courtroom | Topic | Courtroom | 0.9 | 210 |
| Courtroom | Title | Courtroom | 0.0 | 215 |
| Dramas | Genre | Drama | 0.3 | 210, 215, 220 |
| Or | Boolean | Or | 0.9 | 210, 220 |
| Thriller | Genre | Thriller | 0.4 | 210, 215, 220 |
| Movies | Media Type | Movie | 0.9 | 210, 215, 220 |
| Without | Boolean | Not | 0.9 | 210, 215, 220 |
| R | Person | R | 0.0 | 215 |
| R | Rating | R | 0.9 | 210 |
| Ratings | Category | Rating | 0.9 | 220, 225 |

As illustrated in Table 1, each word of the query search string may be assigned an entity type, a normalized value, and a probability value. The Input column may indicate the component from which an input was received, such as probabilistic linguistic parser 210 (indicated in Input column as "210"), named entity recognizer 215 (indicated in Input column as "215"), part-of-speech tagger 220 (indicated in Input column as "220") and stemmer and lemmatizer 225 (indicated in Input column as "225"). In cases where the lookup yields no match, the probability value may be 0 (e.g., for "R" as a person, probability value is 0).

Natural language query merger 235 may include logic that mergers different interpretations of a word or a phrase into a single natural language utterance (NLU) query. According to an exemplary embodiment, natural language query merger 235 may use the positional probabilities to tag each word or phrase with a particular entity in the merged utterance. For example, if probabilistic linguistic parser 210 tagged the word "godfather" as a title, and named entity recognizer 215 tagged the word "godfather" as a topic, natural language query merger 235 may select the interpretation that yields the higher probability. For example, given the popularity of the "Godfather" movies, natural language query merger 235 may select the interpretation of "godfather" as a title.

According to an exemplary embodiment, when there are conflicts in the interpretation or identification of the word or phrase between different models, natural language query merger 235 may select the interpretation that results in a greater number of words being tagged. Natural language query merger 235 may add up the probabilities of each of the entity structures (e.g., word or phrase) recognized by each model, and select the option that yields the highest probability value. For example, for the phrase "Pirates of the Caribbean," there may be one match for title, and another match for "Pirates" as a topic and "Caribbean" as a topic. In such a case, because "Pirates of the Caribbean" will yield a complete match as a title, natural language query merger 235 may resolve this conflict. Additionally, given the popularity of the "Pirates of the Caribbean" movie franchise, title as the entity should yield a higher probability score than topic. Also, whenever there are Boolean operators in a query search string, part-of-speech tagger 220 may match the Boolean operators to their corresponding operand structure. Natural language query merger 235 may output the merged NLU query to searcher and fetcher 245. According to an exemplary embodiment, the output may be in a JavaScript Object Notation (JSON) or other suitable data interchange format (e.g., plain text, Extensible Markup Language (XML) etc.).

Auto-suggest manager 240 may include logic that fetches search results based on autosuggest scores associated with contents and input from natural language query merger 235. Auto-suggest manager 240 may provide the fetch results to searcher and fetcher 245 so as to be added to the search results fetched by searcher and fetcher 245. Historical user selection data may be used to generate an "autosuggest" score for a search string (e.g., a word, a phrase, etc.). For example, when a user searches term "u" (e.g., u being a word or a phrase) and then selects a content item "i" from the search results, auto-suggest manager 240 (or another component) may calculate an auto-suggest score based on a function AQ, u), such that the output is a measure of how many times users have selected content item, i, after searching for the term u. When A(i,u) reaches a threshold value based on searches conducted and correlation between the search term and selection of the content, a final auto-suggest score, A', may be calculated. According to an exemplary implementation, the final auto-suggest may be calculated according to the exemplary equation, $$A'(i,u)=\log_{10}(\max(A(i,u),10)) \quad (1)$$

Other formulations are possible to generate a value in the range of 1-10, for example, or within some other configurable range of values.

Searcher and fetcher 245 may include logic that generates a search query based on the output from natural language query merger 235. For each modifier, searcher and fetcher 245 may add a sort filter based on the modifier. For example, for the word "latest", searcher and fetcher 245 may select and add a sort field of "releaseDate" having an order of "descending." According to another example, for the word "best", searcher and fetcher 245 may select and add a sort field of "popularity" having an order of "descending." Other types of word or phrase modifiers may influence the presentation of search results (e.g., ascending order, descending order, etc.).

Searcher and fetcher 245 may include logic that searches for content based on the search query, and retrieves the contents resulting from the search. Searcher and fetcher 245 may retrieve contents that yield the top autosuggest scores (based on expression (1)) and add these contents, if not already included, with the search results. Searcher and fetcher 245 may log the voice utterance, the natural language search query, the search query, and the search results.

Searcher and fetcher 245 may include logic that ranks contents retrieved from the search query based on relevance. For example, searcher and fetcher 245 may assign values to contents based on various criteria pertaining to the contents. For example, the various criteria may include popularity, trending sore, awards attributed to a content, pricing of a content, recency (e.g., recency of the production and/or release of a content), an auto-suggest score, and/or other configurable criteria that may be used to modify the relevance of the content in relation to other contents (e.g., a value indicative of feedback from previous natural language and search queries from users, user selection and/or omission of content, etc.). According to an exemplary embodiment, a content may have a relevancy score. The relevancy score may be a pre-computed value that correlates to the content. Searcher and fetcher 245 may calculate one or multiple scores (or sub-scores) pertaining to relevancy. For example, a popularity score (mod=sqrt, boost=10), an auto-suggest score (mod=log 10, boost=100), a recency score (e.g., releasedate (mod=Gaussian_decay, boost=2)), etc., may be calculated.

According to an exemplary embodiment, content search and discovery device 115 may allow a user to provide feedback for a search result within the same search session, in which a new search may be invoked. This may occur, for example, if the user wishes to refine the search or deems the search result to be too generalized. According to such circumstances, content search and discovery device 115 may re-calculate the search query, the search, the retrieval, and/or the ranking, in whole or in part. For example, if a new voice input ($vi_{cur}$) is the same as the previous voice input ($vi_{prev}$), then content search and discovery device 115 may search for alternate utterances from the ASR engine or other input stage that inputs into text utterance processor 205, and then proceed in further processing from Stage 1, as described herein.

According to another example, if the new voice input is different from the previous voice input, Stage 2 and onward for the new voice input may be performed. As previously described, various aspects of processing of the search query, conducting the search, etc. (e.g., adding modifiers, relevance parameters, etc.) may be performed based on the new voice input. According to yet another example, if there is partial generalization/refinement, content search and discovery device 115 may modify the previous voice input by adding the partial context with refinement or generalization to create a new full voice input ($vi_{modified}$), and perform further processing from Stage 2 and onward based on the new full voice input.

Referring back to FIG. 1, user management device 120 includes a network device that stores user profile information pertaining to users of the content service. For example, the user profile information may include historical information pertaining to the user, such as information pertaining to previous search results (e.g., candidate offerings and/or forms of user input tracking), and content selected and/or consumed (client-side logs). The user profile information may also include user account information that may indicate a user account for accessing the content service. Additionally, for example, the user profile information may include demographic information of the user, a user identifier associated with the user, and user device information. For example, the user may set various parameter values pertaining to the content service and/or indicate a preference among content genres, viewing patterns, habits, or trends.

Although not illustrated, content network 105 may include other types of network devices that provide various content services, such as a content processing device (e.g., transcoding, encryption, machine learning, etc.), a digital rights management device, a licensing device, a login device (e.g., authentication, authorization, etc.), a billing device, and a content server device.

Network 140 includes one or multiple networks of one or multiple types. For example, network 140 may be implemented to include a terrestrial network, a content delivery network, a wireless network, a wired network, an optical network, a radio access network, a core network, a packet network, an Internet Protocol (IP) network, the Internet, the World Wide Web, a private network, a public network, a television distribution network, a streaming network, a mobile network, and/or other type of network that provides access to content network 105.

User device 150 includes a device that has computational and communication capabilities. User device 150 may be implemented as a mobile device, a portable device, or a stationary device. By way of further example, user device 150 may be implemented as a smartphone, a personal digital assistant, a tablet, a netbook, a phablet, a wearable device, a set-top box, an infotainment system in a vehicle, a smart television, a game system, a music playing system, a computer (e.g., a desktop, a laptop, etc.), or some other type of user device (e.g., a remote control with voice input, etc.). User device 150 may include one or multiple devices, such as a main device, or the main device and a peripheral device. According to various exemplary embodiments, user device 150 may be configured to execute various types of software (e.g., applications, programs, etc.). The number and the types of software may vary among user devices 150. According to an exemplary embodiment, user device 150 includes software that provides access to and/or use of the content service, which includes the natural language-based search and discovery service, as described herein. For example, the software may be implemented as a browser, a mobile application, or other type of client application. User device 150 may include a microphone that captures voice input from a user 160. User 160 may be a person that operates user device 150.

FIG. 3 is a diagram illustrating exemplary components of a device 300 that may be included in one or more of the devices described herein. For example, device 300 may correspond to components included in network devices of content network 105 and/or user device 150. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), graphics processing units (GPUs), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to network devices of content network 105, software 320 may include an application that, when executed by processor 310, provides the functions of the natural language-based search and discovery service, as described herein. Software 320 may also include firmware, middleware, microcode, hardware description language (HDL), and/or other form of instruction. Software 320 may be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard. Communication interface 325 may include an antenna. Communication interface 325 may include various processing logic or circuitry (e.g., multiplexing/de-multiplexing, filtering, amplifying, converting, error correction, etc.). Communication interface 325 may be implemented as a point-to-point interface, a service based interface, etc.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., centralized, distributed, etc.) and according to various network architectures (e.g., a virtualized function, a server, a client, etc.). Device 300 may be implemented in the same manner. For example, as a virtualized function, device 300 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a public/private cloud or other type of network.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
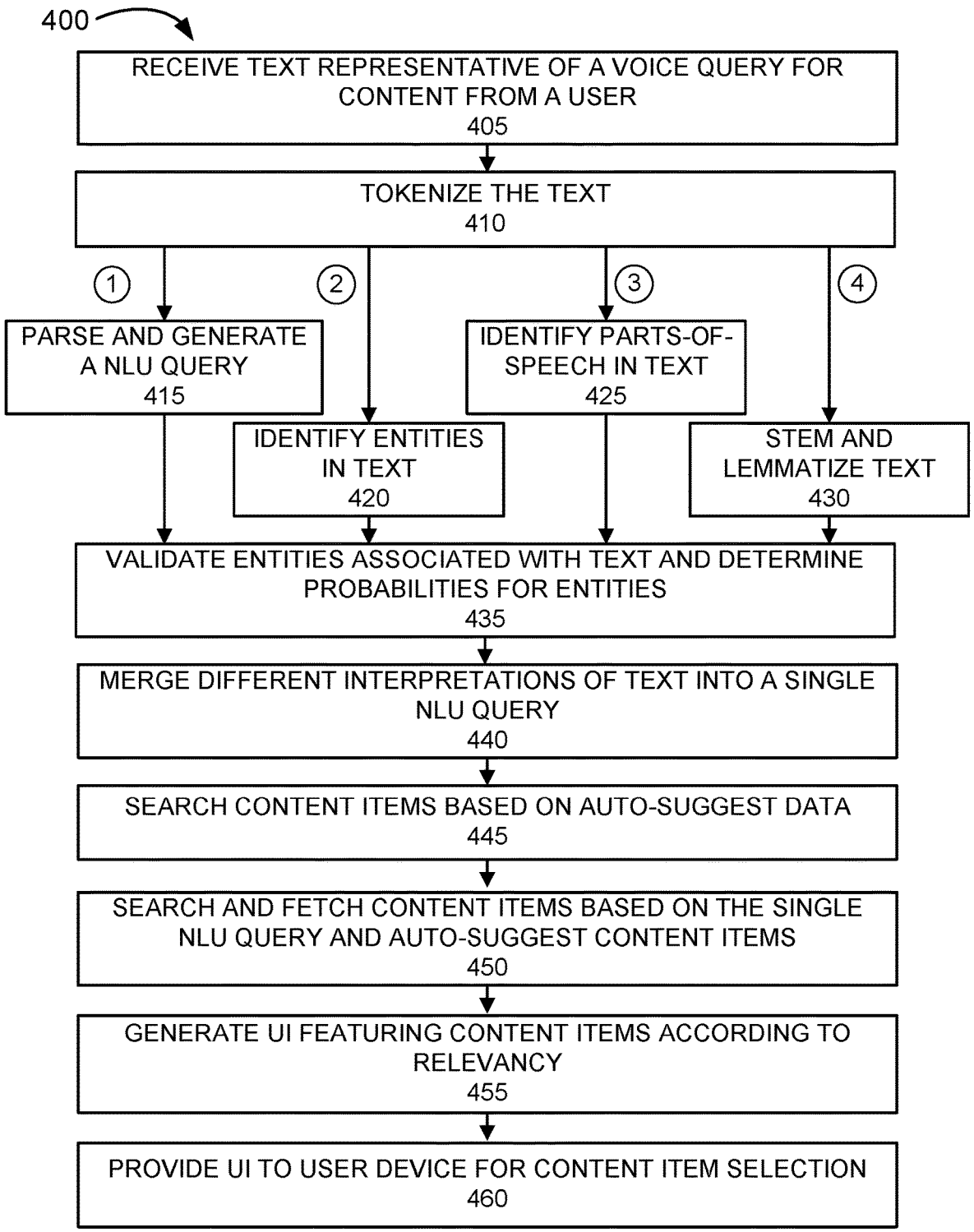
FIG. 4 is a flow diagram illustrating an exemplary process of an exemplary embodiment of the natural language-based search and discovery service.

FIG. 4 is a flow diagram illustrating an exemplary process 400 of an exemplary embodiment of the natural language-based search and discovery service. According to an exemplary embodiment, a network device (e.g., content search and discovery device 115) performs steps of process 400. For example, processor 310 executes software 320 to perform the steps illustrated in FIG. 4 and described herein.

According to an exemplary process 400 shown in FIG. 4, user 160 associated with user device 150 may have an account for the content service of content network 105. User 160 may access the content service via user device 150.

Referring to FIG. 4, in block 405, content search and discovery device 115 may receive a text, which represents a voice query for content, from a user. For example, text utterance processor 205 may receive, via user device 150 and network 140, text from user 160 wishing to search for content. For example, the text may be "What was the Tom Cruise courtroom drama?", "Find shows like Game of Thrones", "Show me recent Tom Hanks movies", or some other text query for content.

In block 410, content search and discovery device 115 may tokenize the received text. For example, text utterance processor 205 may parse the text into separate words, a phrase (e.g., a grouping of words), and/or other types of entities (e.g., a string, a single letter, a number, or another type of natural language utterance). Text utterance processor 205 may output the tokenized text to probabilistic linguistic parser 210, named entity recognizer 215, part-of-speech tagger 220, and stemmer and lemmatizer 225.

In block 415, content search and discovery device 115 may parse and generate an NLU query based on the text. For example, probabilistic linguistic parser 210 may include a PCFG parser or another type of WCFG parser, which has been trained. The PCFG parser or WCFG parser may include lexicalization. Probabilistic linguistic parser 210 may parse the text and assign a probability of a parse based on the probability of each production (e.g., grammar rule) used for the parse. Probabilistic linguistic parser 210 may use probabilistic lookup tables for each parse. Based on the output of the PCFG parser or the WCFG parser, probabilistic linguistic parser 210 may identify the types (e.g., intent and entity) and various entity categories (e.g., person, title, modifiers, etc.), as described herein. Probabilistic linguistic parser 210 may generate an NLU query based on the entity types and categories. Probabilistic linguistic parser 210 may output the NLU query to dictionary-based named entity validator/probabilistic pre-searcher 230.

In block 420, content search and discovery device 115 may identify entities in the text. For example, named entity recognizer 215 may infer types and categories of intent types and entity types included in the text based on statistical analysis and a named entity recognizer model, as previously described. For example, named entity recognizer 215 may infer from the name of an obscure director (e.g., Bernard Rose) that Bernard Rose is a director and/or a person. Named entity recognizer 215 may output named and parsed entities to dictionary-based named entity validator/probabilistic pre-searcher 230.

In block 425, content search and discovery device 115 may tag POS in the text. For example, part-of-speech tagger 220 may assign to each entity a part of speech, such as a verb, a noun, and other types of syntactic and morphological structures, as described herein. Part-of-speech tagger 220 may perform other operations, such as disambiguation, medial capitalization to extract names, etc. Part-of-speech tagger 220 may provide an output to dictionary-based named entity validator/probabilistic pre-searcher 230.

In block 430, content search and discovery device 115 may stem and lemmatize the text. For example, stemmer and lemmatizer 225 may identify a root or a base form of a word included in the text, as previously described. Stemmer and lemmatizer 225 may be trained with media-specific root forms pertaining to a content catalog, as previously described. Stemmer and lemmatizer 225 may provide an output to dictionary-based named entity validator/probabilistic pre-searcher 230.

In block 435, content search and discovery device 115 may validate entities associated with the text and determine probabilities for the entities. For example, dictionary-based named entity validator/probabilistic pre-searcher 230 may receive an output from probabilistic linguistic parser 210, named entity recognizer 215, part-of-speech tagger 220, and stemmer and lemmatizer 225. As previously described, dictionary-based named entity validator/probabilistic pre-searcher 230 may perform a lookup and determine a value (e.g., a normalized value, the word itself, etc.) and a corresponding probability value that indicates the probability of the value being correct. Dictionary-based named entity validator/probabilistic pre-searcher 230 may also log the inputs used to make the determination. Dictionary-based named entity validator/probabilistic pre-searcher 230 may output to natural language query merger 235.

In block 440, content search and discovery device may merge different interpretations of the text into a single NLU query. For example, natural language query merger 235 may receive an output from dictionary-based named entity validator/probabilistic pre-searcher 230. Natural language query merger 235 may resolve different interpretations of words, phrases, etc., pertaining to intent types, entity types, and/or other values, as previously described. For example, the resolution of different interpretations may be based on the probability values, the number of words tagged, and/or parameters (e.g., historical information associated with the user, etc.). Natural language query merger 235 may provide an output to searcher and fetcher 245.

In block 445, content search and discovery device may search and select content items based on auto-suggest data. For example, auto-suggest manager 240 may search and fetch content items based on autosuggest scores, as previously described.

In block 450, content search and discovery device may search and fetch content items based on the single NLU query. For example, searcher and fetcher 245 may search content catalog device 110 based on the single NLU query, and select content items that match the NLU query. Searcher and fetcher 245 may sort and/or rank the selected content items for presentation to the user. Searcher and fetcher 245 may receive an output from auto-suggest manager 240, and use the output as a basis for the selection, sorting, and ranking of content items according to relevance, as previously described.

In block 455, content search and discovery device 115 may generate a user interface that indicates the content items. For example, content search and discovery device 115 may select content items to be included in the user interface based on the content items of the single NLU query and auto-suggest manager 240. For example, a set of Tom Hanks movies (e.g., Captain Philips, Big, Cloud Atlas) may have been selected based on the NLU query and previous top-selected content items (e.g., The Post, Forrest Gump, and Cast Away) for that utterance may have been selected based on the auto-suggest data. The content items may be sorted based on their respective relevance. In block 460, content search and discovery device 115 may provide the user interface to user device 150 for content item selection by user 160. For example, referring to FIG. 5, a graphical user interface 500 may include a search field 505 that indicates the user's voice input, and the search results. According to this example, the search results include images 510-1 through 510-9 and titles 1-9 associated with the images 510. Images 510 may be images that represent the content items, such as a movie cover or poster, or other suitable image. According to other examples, user interface 500 may include additional, fewer, and/or different instances of information, arrangement, and/or elements.

Although FIG. 4 illustrates an exemplary process 400 of content search and discovery device 115, according to other embodiments, process 400 may include additional operations, fewer operations, and/or different operations than those illustrated in FIG. 4 and described herein. Process 400 may be iteratively performed. For example, subsequent to the presentment of the search result, user 160 may refine the search terms, and another search may be performed, as previously described. Process 400 may end when user 160 exits the content service, selects content to view, purchase, or download, and/or other user input (or lack thereof) that indicates a search process has ended.

Also, the natural language-based search and discovery system may use client-side media consumption logs for generating the unified NLU query and/or the performance of any other step described in process 400. Additionally, for example, the natural language-based search and discovery system may use historical search data indicating a measure of how many times a particular content item has been selected by users after a search; a quantifiable "popularity" factor for each content item that corresponds to overall user views of each content item; a quantifiable "quality" factor for each content item that may be derived from ratings reviews, critic reviews, etc., as well as other relevance modifiers, such as a quantifiable "recency" factor for each content item, which reflects a general loss of user interest in a content item after its initial availability; a quantifiable "cyclicity" or "seasonality" factor for each content item with respect to the time-of-day, day-of-week, week-of-the-month, month-of-the-year, etc. associated with a user's search query; a quantifiable "similarity" of one content item to another; and/or a relative cost to the user for consumption of a content item.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described with regard to the process illustrated in FIG. 4, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320). The embodiments have been described without reference to the specific software code since the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315.

To the extent the aforementioned embodiments collect, store or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

All structural and functional equivalents to the elements of the various aspects set forth in this description that are known in the art or later come to be known in the art are expressly incorporated herein by reference and are intended to be encompassed by the claims.

What is claimed is:

1. A method comprising:
receiving, by a network device, a search request for content based on a voice query from a user;
performing, by the network device, a natural language interpretation of the search request that includes a multi-interpretative procedure including:
performing, by the network device, a first parsing of the search request;
generating, by the network device based on the first parsing, a natural language understanding (NLU) query including a first query object, wherein the NLU query including the first query object is further generated based on grammar rules indicating conditional probabilities of objects of the first parsing;
performing, by the network device, a second parsing of the search request;
identifying, by the network device based on the second parsing, a second query object based on query object types;
performing, by the network device, a third parsing of the search request;
identifying, by the network device based on the third parsing, parts of speech pertaining to a third query object;
validating, by the network device, the first query object, the second query object, and the third query object based on the query object types;
assigning, by the network device based on the validating, a first probability value for the first query object, a second probability value for the second query object, and a third probability value for the third query object;
generating, by the network device based on the assigning, a unified NLU query by resolving conflicts in the first query object, the second query object, and the third query object and merging the resolve of the first query object, the second query object, and the third query object;
searching, by the network device based on the unified NLU query, contents;
generating, by the network device based on the searching, a user interface including a search result indicating one or multiple content items; and
presenting, by the network device via the user interface, the search result to the user.

2. The method of claim 1, further comprising:
performing, by the network device, at least one of stemming or lemmatizing of the search request; and wherein the generating of the unified NLU query comprises:
generating, by the network device based on performing the at least one of stemming or lemmatizing, the unified NLU query.

3. The method of claim 2, wherein performing the at least one of stemming or lemmatizing comprises:
identifying, by the network device, a fourth query object.

4. The method of claim 1, wherein the assigning further comprises:
assigning, by the network device, a normalized query object for at least one of the first query object, the second query object, or the third query object.

5. The method of claim 1, wherein the generating of the unified NLU query comprises:
selecting, by the network device, an interpretation for at least one of the first query object, the second query object, or the third query object based on a number of objects included in the first query object, the second query object, or the third query object and associated probability values of the objects relative to a conflicting interpretation of the first query object, the second query object, or the third query object.

6. The method of claim 1, wherein the NLU query is further generated based on the query object types.

7. The method of claim 1, wherein the query object types include an intent type and an entity type, wherein the intent type includes a word or a phrase indicating a user command, and the entity type includes multiple categories relating to metadata for available content items.

8. The method of claim 1, wherein the contents include movies and television programs, and the method further comprising:
searching, by the network device based on autosuggest data, additive contents; and
selecting, by the network device from the contents and the additive contents, the one or multiple content items based on relevance.

9. A network device comprising:
a memory, wherein the memory stores instructions; and
a processor, wherein the processor executes the instructions to:
receive a search request for content based on a voice query from a user;
perform a natural language interpretation of the search request that includes a multi-interpretative procedure including:
perform a first parsing of the search request;
generate, based on the first parsing, a natural language understanding (NLU) query including a first query object, wherein the NLU query including the first query object is further generated based on grammar rules indicating conditional probabilities of objects of the first parsing;
perform a second parsing of the search request;
identify, based on the second parsing, a second query object based on query object types;
perform a third parsing of the search request;
identify, based on the third parsing, parts of speech pertaining to a third query object;
validate the first query object, the second query object, and the third query object based on the query object types;
assign, based on the validation, a first probability value for the first query object, a second probability value for the second query object, and a third probability value for the third query object;

generate, based on the assignment, a unified NLU query by resolving conflicts in the first query object, the second query object, and the third query object and merging the resolve of the first query object, the second query object, and the third query object;

search, based on the unified NLU query, contents;

generate, based on the search, a user interface including a search result indicating one or multiple content items; and present, via the user interface, the search result to the user.

10. The network device of claim 9, wherein the processor further executes the instructions to:

perform at least one of stemming or lemmatizing of the search request; and wherein, when generating of the unified NLU query, the processor further executes the instructions to:

generate, based on the performance of the at least one of stemming or lemmatizing, the unified NLU query.

11. The network device of claim 10, wherein, when performing the at least one of stemming or lemmatizing, the processor further executes the instructions to:

identify a fourth query object.

12. The network device of claim 9, wherein, when assigning, the processor further executes the instructions to:

assign a normalized query object for at least one of the first query object, the second query object, or the third query object.

13. The network device of claim 9, wherein, when generating the unified NLU query, the processor further executes the instructions to:

select an interpretation for at least one of the first query object, the second query object, or the third query object based on a number of objects included in the first query object, the second query object, or the third query object and associated probability values of the objects relative to a conflicting interpretation of the first query object, the second query object, or the third query object.

14. The network device of claim 9, wherein the NLU query including the first query object is further generated based on grammar rules indicating conditional probabilities of objects of the first parsing the query object types.

15. The network device of claim 9, wherein the query object types include an intent type and an entity type, wherein the intent type includes a word or a phrase indicating a user command, and the entity type includes multiple categories relating to metadata for available content items.

16. A non-transitory computer-readable storage medium storing instructions executable by a processor of a device, which when executed, cause the device to:

receive a search request for content based on a voice query from a user;

perform a natural language interpretation of the search request that includes a multi- interpretative procedure including:

perform a first parsing of the search request;

generate, based on the first parsing, a natural language understanding (NLU) query including a first query object, wherein the NLU query including the first query object is further generated based on grammar rules indicating conditional probabilities of objects of the first parsing;

perform a second parsing of the search request;

identify, based on the second parsing, a second query object based on query object types;

perform a third parsing of the search request;

identify, based on the third parsing, parts of speech pertaining to a third query object;

validate the first query object, the second query object, and the third query object based on the query object types;

assign, based on the validation, a first probability value for the first query object, a second probability value for the second query object, and a third probability value for the third query object;

generate, based on the assignment, a unified NLU query by resolving conflicts in the first query object, the second query object, and the third query object and merging the resolve of the first query object, the second query object, and the third query object;

search, based on the unified NLU query, contents;

generate, based on the search, a user interface including a search result indicating one or multiple content items; and present, via the user interface, the search result to the user.

17. The non-transitory computer-readable storage medium of claim 16, wherein the instructions further comprise instructions, which when executed, cause the device to:

perform at least one of stemming or lemmatizing of the search request; and wherein the generating comprises:

generate, based on performing the at least one of stemming or lemmatizing, the unified NLU query.

18. The non-transitory computer-readable storage medium of claim 16, wherein the instructions to perform at least one of stemming or lemmatizing further comprises instructions, which when executed, cause the device to:

identify a fourth query object.

19. The non-transitory computer-readable storage medium of claim 16, wherein the query object types include an intent type and an entity type, wherein the intent type includes a word or a phrase indicating a user command, and an entity type includes multiple categories relating to metadata for content items.

20. The non-transitory computer-readable storage medium of claim 16, wherein the contents include movies and television programs, and wherein the instructions further comprise instructions, which when executed, cause the device to:

search, based on autosuggest data, additive contents; and select from the contents and the additive contents, the one or multiple content items based on relevance.

* * * * *